United States Patent
Keselman et al.

(10) Patent No.: US 11,431,511 B2
(45) Date of Patent: Aug. 30, 2022

(54) CENTRALIZED AUTHENTICATION AND AUTHORIZATION WITH CERTIFICATE MANAGEMENT

(71) Applicant: Intuit Inc., Mountain View, CA (US)

(72) Inventors: Gleb Keselman, Modiin (IL); Yaron Sheffer, Hod Hasharon (IL); Mike Rooz, Hod Hasharon (IL)

(73) Assignee: INTUIT INC., Mountain View, CA (US)

( * ) Notice: Subject to any disclaimer, the term of this patent is extended or adjusted under 35 U.S.C. 154(b) by 331 days.

(21) Appl. No.: 16/429,631

(22) Filed: Jun. 3, 2019

(65) Prior Publication Data
US 2020/0382323 A1   Dec. 3, 2020

(51) Int. Cl.
*H04L 9/32*   (2006.01)
*H04L 9/30*   (2006.01)
*H04L 9/40*   (2022.01)

(52) U.S. Cl.
CPC ............. *H04L 9/3268* (2013.01); *H04L 9/30* (2013.01); *H04L 9/3213* (2013.01);
(Continued)

(58) Field of Classification Search
CPC ....... H04L 9/3268; H04L 9/30; H04L 9/3213; H04L 63/20; H04L 63/0823; H04L 63/0807; H04L 63/10
See application file for complete search history.

(56) References Cited

U.S. PATENT DOCUMENTS

| 2004/0117623 A1* | 6/2004 | Kalogridis | H04L 9/3247 |
| | | | 713/185 |
| 2010/0082975 A1* | 4/2010 | Metke | H04L 63/064 |
| | | | 713/157 |

(Continued)

FOREIGN PATENT DOCUMENTS

| EP | 2 768 178 | 8/2014 |
| WO | WO 2019/032240 | 2/2019 |

OTHER PUBLICATIONS

International Search Report issued in PCT/US2019/043783 dated Feb. 25, 2020.
Written Opinion issued in PCT/US2019/043783 dated Feb. 25, 2020.

*Primary Examiner* — Cheng-Feng Huang
(74) *Attorney, Agent, or Firm* — DLA Piper LLP (US)

(57) ABSTRACT

At least one processor of a central authority separate from a computing process may establish a first trust relationship between the computing process and a central authority separate from the computing process. The establishing may include authenticating the computing process, which may include providing a signed token to the computing process, receiving a request for the certificate from the computing process including the signed token and policy ID data, determining that the computing process is eligible for the certificate according to a policy that associates the certificate with the policy ID data, and validating the signed token. In response to the establishing, the at least one processor may obtain the certificate. The certificate may be signed by a third-party certificate authority with which the central authority has a second trust relationship separate from the first trust relationship. The at least one processor may provide the certificate to the computing process.

18 Claims, 7 Drawing Sheets

(52) U.S. Cl.
CPC ...... *H04L 63/0807* (2013.01); *H04L 63/0823* (2013.01); *H04L 63/10* (2013.01); *H04L 63/20* (2013.01)

(56) References Cited

U.S. PATENT DOCUMENTS

| | | | |
|---|---|---|---|
| 2010/0313032 A1* | 12/2010 | Oswalt | H04L 63/0823 713/176 |
| 2011/0162040 A1* | 6/2011 | Stephens | H04L 63/101 726/1 |
| 2013/0311771 A1 | 11/2013 | Hoggan | |
| 2014/0136838 A1* | 5/2014 | Mossbarger | H04L 9/3263 713/156 |
| 2016/0335445 A1* | 11/2016 | Stephens | H04L 63/101 |
| 2018/0183586 A1* | 6/2018 | Bhargav-Spantzel | G06F 21/33 |
| 2019/0052621 A1 | 2/2019 | Sahraei et al. | |

\* cited by examiner

CENTRALIZED AUTHENTICATION AND AUTHORIZATION WITH CERTIFICATE MANAGEMENT

BACKGROUND OF THE DISCLOSURE

Figure 1:
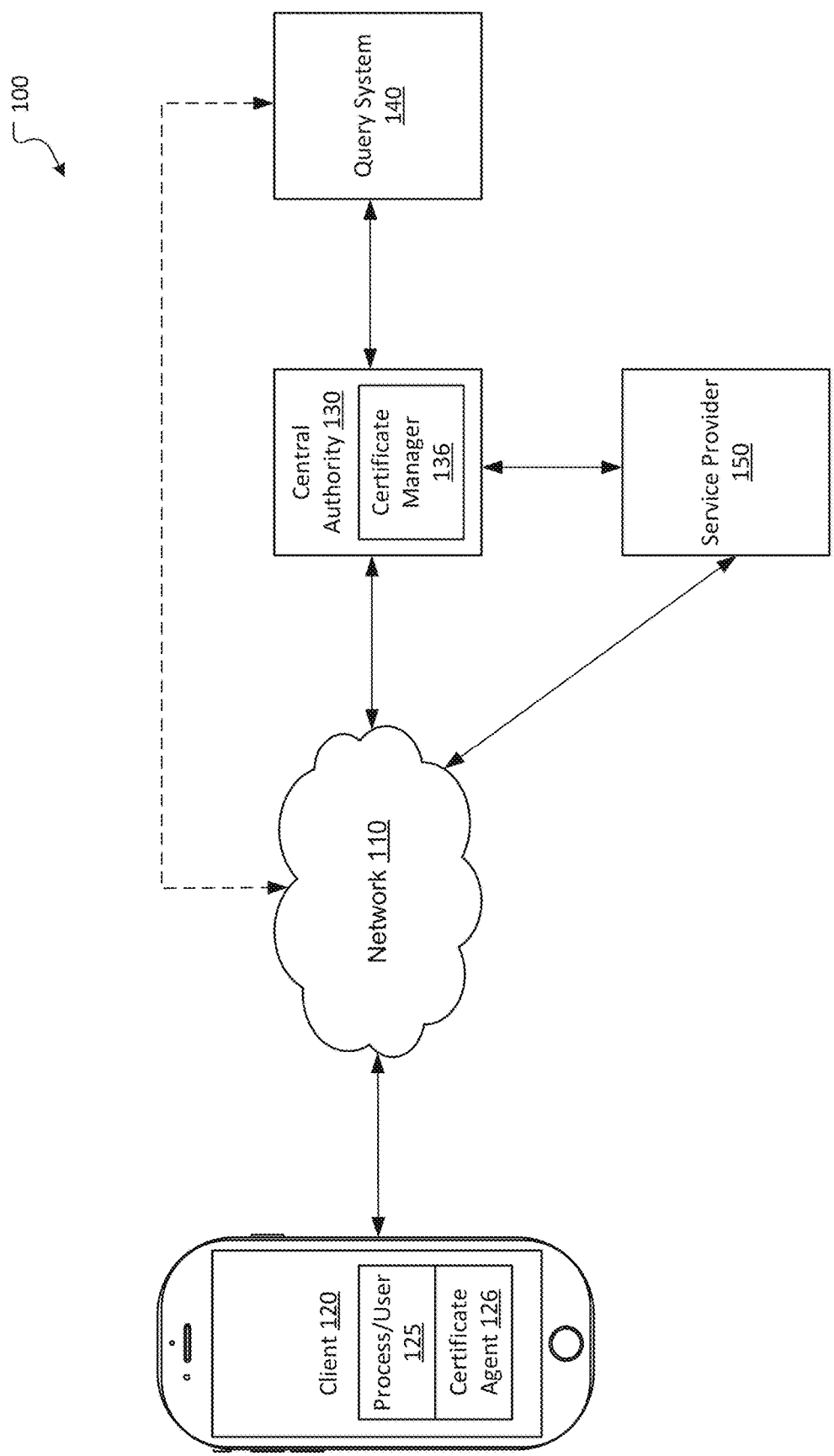
FIG. 1 shows an authentication system according to an embodiment of the present disclosure.

Computing services may provide access to clients based on permissions. For example, services may be provided to client machines through one or more networks and/or internally within the machines themselves. In some cases, services may be provided to client machines on a process and/or user level basis. In order to consume a service, the client machine, process, and/or user may be authenticated to confirm its identity and may be authorized to confirm that it meets applicable policy requirements and can be granted access.

Client machines, processes, and/or users may access a variety of services. Each service can implement authentication and authorization mechanisms on its own. However, in this case, each service may require its own logic for determining which machines, processes, and/or users should be granted access. Moreover, each service may have its own policy for determining who should be granted access, and these policies may be configured and controlled separately from policies of other services. In some cases, services may use certificates to determine who should be granted access and/or to validate the authentic identity of a party attempting to gain access. Certificates may be issued by third parties on an individual process, service, device, address, or user level, for example.

DETAILED DESCRIPTION OF SEVERAL EMBODIMENTS

Some embodiments described herein may provide a service ecosystem with centralized elements that may perform authentication and/or authorization for a plurality of separate services. Centralized authentication and/or authorization from a trusted authority (e.g., a central authority) may control access to any service registered with the authority. Accordingly, authentication and/or authorization logic may be performed efficiently by a single service, which may apply policies to a plurality of services and/or for different machines, processes, and/or users. Embodiments disclosed herein may expand the authentication paradigm by abstracting individual computing process (e.g., client machine, client process, server machine, server process, etc.) identities to a set of restrictions the identities may match to be considered as authenticated.

In some embodiments, the central authority has a relationship of trust with a certification authority. Accordingly, in addition to or instead of applying policies to a plurality of services and/or for different machines, processes, and/or users directly, the central authority may securely communicate with the certification authority to provide certificates for use in authentication operations by the different machines, processes, and/or users. Any entity having a relationship of trust with the central authority may leverage a separate relationship of trust between the central authority and the certification authority without having to independently establish its own relationship with the certification authority.

As described in detail below, a service may register with the central authority, which may allow the central authority to perform authentication for computing processes. In many of the examples described below, computing processes include clients of the service, but the same authentication may be performed for any computing process. After registration, the service may add access policies to the central authority. A client machine (or process or user, in some cases) may be authenticated based on access policy criteria, for example by the central authority checking that the client machine matches all criteria. The client machine may not have to be a single machine, and it may be possible that several machines in a fleet may match the criteria. Each access policy may have a unique access policy ID (authentication ID) which may be distributed to client machines. When a client machine attempts to access a service, the client machine may send a request to the central authority with information required by the corresponding access policy. If a client machine complies with the access policy, it may obtain temporary credentials which may be signed by the central authority. In every request to the service, the client machine may be required to include these temporary credentials. The service may validate temporary credentials by fetching a verification key from the central authority and/or by sending a validation request together with the temporary credentials to the central authority.

In some embodiments, the temporary credentials may be used to generate, sign, and/or obtain certificates that may be used to provide access to services. For example, a client machine may authenticate with the central authority using the temporary credentials and may request a certificate. The central authority may be configured to validate the temporary credentials as noted above and, if the temporary credentials are valid, may leverage a trust relationship with a certification authority to generate, sign, and/or obtain the requested certificate. The central authority may provide the certificate to the client machine, and the client machine may be able to use the certificate in any way, for example for validation operations involving third-party systems.

Figure 2:
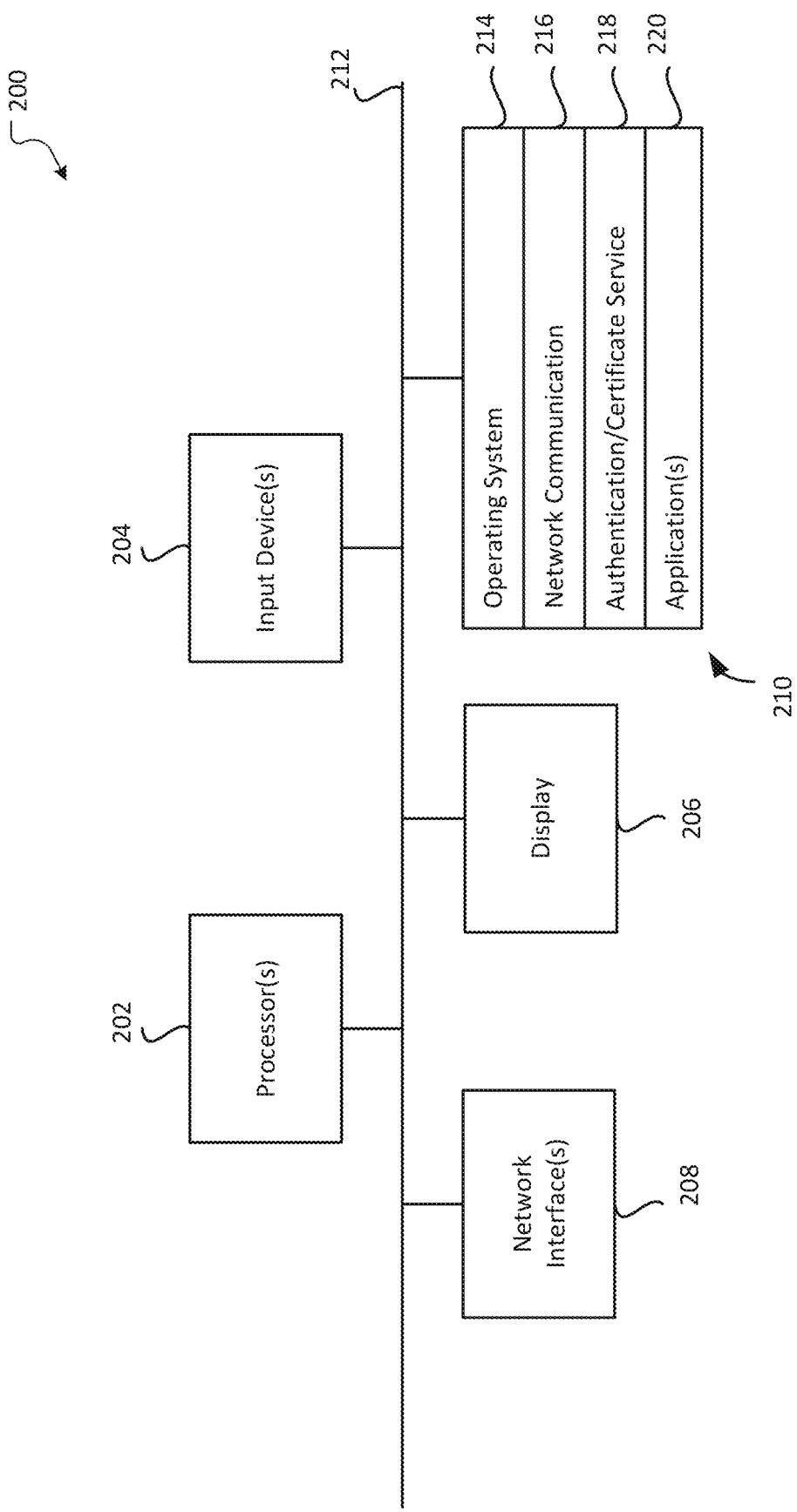
FIG. 2 shows a computing device according to an embodiment of the present disclosure.

FIG. 1 shows an authentication system according to an embodiment of the present disclosure. System 100 may include elements such as at least one client 120, central authority 130, query system 140, and/or at least one service provider 150. Each of these elements may include one or more physical computing devices (e.g., which may be configured as shown in FIG. 2). In some embodiments, one physical computing device may provide at least two of the elements, for example central authority 140 and query system 150 may be provided by a single computing device. In some embodiments, one or more service providers 150 may be provided by the same computing device and/or the same device that provides central authority 140 and/or query system 150. In some embodiments, client 120 and service provider 150 may be provided by a single computing device. In some embodiments, client 120 may be any device configured to provide access to services. For example, client 120 may be a smartphone, personal computer, tablet, laptop computer, or other device. In some embodiments, service provider 150 may be any device configured to host a service, such as a server or other device or group of devices. In some embodiments, client 120 may be a service running on a device, and may consume other services as a client of those services (e.g., as a client of other service instances, virtual machines, and/or servers). In some embodiments, client 120 may be any device, element, process, service, etc. that can use a certificate for interactions with any other device, element, process, service, etc. Certificates generated and/or used as described herein may include any X.509 certificates or any other types of certificates complying with any other certification standard(s).

The elements may communicate with one another through at least one network 110. Network 110 may be the Internet and/or other public or private networks or combinations thereof. For example, in some embodiments, at least data central authority 130, query system 140, and/or at least one service provider 150 may communicate with one another over secure channels (e.g., one or more TLS/SSL channels). In some embodiments, communication between at least some of the elements of system 100 may be facilitated by one or more application programming interfaces (APIs). APIs of system 100 may be proprietary and/or may be examples available to those of ordinary skill in the art such as Amazon® Web Services (AWS) APIs or the like.

Specific examples of the processing performed by the elements of system 100 in combination with one another are given below. However, the roles of client 120, central authority 130, query system 140, and service provider 150 may be summarized as follows. Client 120 may attempt to access a service provided by service provider 150. The access may require authentication and/or authorization of client 120 at a device level or at a specific client process and/or user (e.g., process/user 125) level. Central authority 130 may perform authentication and/or authorization of client(s) 120 (and/or client process/user 125) for service provider(s) 150 registered with central authority 130, as described below. In some embodiments, central authority 130 may use query system 140 to gather data used in the authentication and/or authorization, as described below. In some embodiments, central authority 130 may include certificate manager 136, which may be a component of a same device as central authority 130 and/or may be embodied as a separate device or devices (e.g., as a separate certificate manager server or servers in communication with a server or servers providing central authority 130). In some embodiments, certificate manager 136 may interact with certificate agent 126 of client 120 to process certificate generate requests, as described below.

Client 120, central authority 130, query system 140, and service provider 150 are each depicted as single devices for ease of illustration, but those of ordinary skill in the art will appreciate that client 120, central authority 130, query system 140, and/or service provider 150 may be embodied in different forms for different implementations. For example, any of client 120, central authority 130, query system 140, and/or service provider 150 may include a plurality of devices, may be embodied in a single device or device cluster, and/or subsets thereof may be embodied in a single device or device cluster. In another example, a plurality of clients 120 and/or a plurality of service providers 150 may be connected to network 110 and may have their authorizations/authentications managed centrally as described herein. A single user may have multiple clients 120, and/or there may be multiple users each having their own client(s) 120. Client(s) 120 may each be associated with a single process 125, a single user 125, or multiple users and/or processes 125. Furthermore, as noted above, network 110 may be a single network or a combination of networks, which may or may not all use similar communication protocols and/or techniques.

FIG. 2 is a block diagram of an example computing device 200 that may implement various features and processes as described herein. For example, computing device 200 may function as client 120, central authority 130, query system 140, service provider 150, or a portion or combination of any of these elements. In some embodiments, a single computing device 200 or cluster of computing devices 200 may provide each of central authority 130, query system 140, service provider 150, or a combination of two or more of these services. Computing device 200 may be implemented on any electronic device that runs software applications derived from instructions, including without limitation personal computers, servers, smart phones, media players, electronic tablets, game consoles, email devices, etc. In some implementations, computing device 200 may include one or more processors 202, one or more input devices 204, one or more display devices 206, one or more network interfaces 208, and one or more computer-readable mediums 210. Each of these components may be coupled by bus 212, and in some embodiments, these components may be distributed across multiple physical locations and coupled by a network.

Display device 206 may be any known display technology, including but not limited to display devices using Liquid Crystal Display (LCD) or Light Emitting Diode (LED) technology. Processor(s) 202 may use any known processor technology, including but not limited to graphics processors and multi-core processors. Input device 204 may be any known input device technology, including but not limited to a keyboard (including a virtual keyboard), mouse, track ball, and touch-sensitive pad or display. Bus 212 may be any known internal or external bus technology, including but not limited to ISA, EISA, PCI, PCI Express, NuBus, USB, Serial ATA or FireWire. Computer-readable medium 210 may be any medium that participates in providing instructions to processor(s) 202 for execution, including without limitation, non-volatile storage media (e.g., optical disks, magnetic disks, flash drives, etc.), or volatile media (e.g., SDRAM, ROM, etc.).

Computer-readable medium 210 may include various instructions 214 for implementing an operating system (e.g., Mac OS®, Windows®, Linux). The operating system may be multi-user, multiprocessing, multitasking, multithreading, real-time, and the like. The operating system may perform basic tasks, including but not limited to: recognizing input from input device 204; sending output to display device 206; keeping track of files and directories on computer-readable medium 210; controlling peripheral devices (e.g., disk drives, printers, etc.) which can be controlled directly or through an I/O controller; and managing traffic on bus 212. Network communications instructions 216 may establish and maintain network connections (e.g., software for implementing communication protocols, such as TCP/IP, HTTP, Ethernet, telephony, etc.).

Authentication/certificate service instructions 218 may include instructions that perform the various authentication and/or certificate related functions as described herein.

Authentication service/certificate instructions 218 may vary depending on whether computing device 200 is functioning as client 120, central authority 130, query system 140, service provider 150, or a combination thereof.

Application(s) 220 may be an application that uses or implements the processes described herein and/or other processes. The processes may also be implemented in operating system 214.

The described features may be implemented in one or more computer programs that may be executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program may be written in any form of programming language (e.g., Objective-C, Java), including compiled or interpreted languages, and it may be deployed in any form, including as a stand-alone program or as a module, component, subroutine, or other unit suitable for use in a computing environment.

Suitable processors for the execution of a program of instructions may include, by way of example, both general and special purpose microprocessors, and the sole processor or one of multiple processors or cores, of any kind of computer. Generally, a processor may receive instructions and data from a read-only memory or a random access memory or both. The essential elements of a computer may include a processor for executing instructions and one or more memories for storing instructions and data. Generally, a computer may also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data may include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

To provide for interaction with a user, the features may be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features may be implemented in a computer system that includes a back-end component, such as a data server, or that includes a middleware component, such as an application server or an Internet server, or that includes a front-end component, such as a client computer having a graphical user interface or an Internet browser, or any combination thereof. The components of the system may be connected by any form or medium of digital data communication such as a communication network. Examples of communication networks include, e.g., a telephone network, a LAN, a WAN, and the computers and networks forming the Internet.

The computer system may include clients and servers. A client and server may generally be remote from each other and may typically interact through a network. The relationship of client and server may arise by virtue of computer programs running on the respective computers and having a client-server relationship to each other, or by processes running on the same device and/or device cluster, with the processes having a client-server relationship to each other.

One or more features or steps of the disclosed embodiments may be implemented using an API. An API may define one or more parameters that are passed between a calling application and other software code (e.g., an operating system, library routine, function) that provides a service, that provides data, or that performs an operation or a computation.

The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call. API calls and parameters may be implemented in any programming language. The programming language may define the vocabulary and calling convention that a programmer will employ to access functions supporting the API.

In some implementations, an API call may report to an application the capabilities of a device running the application, such as input capability, output capability, processing capability, power capability, communications capability, etc.

Figure 3A:
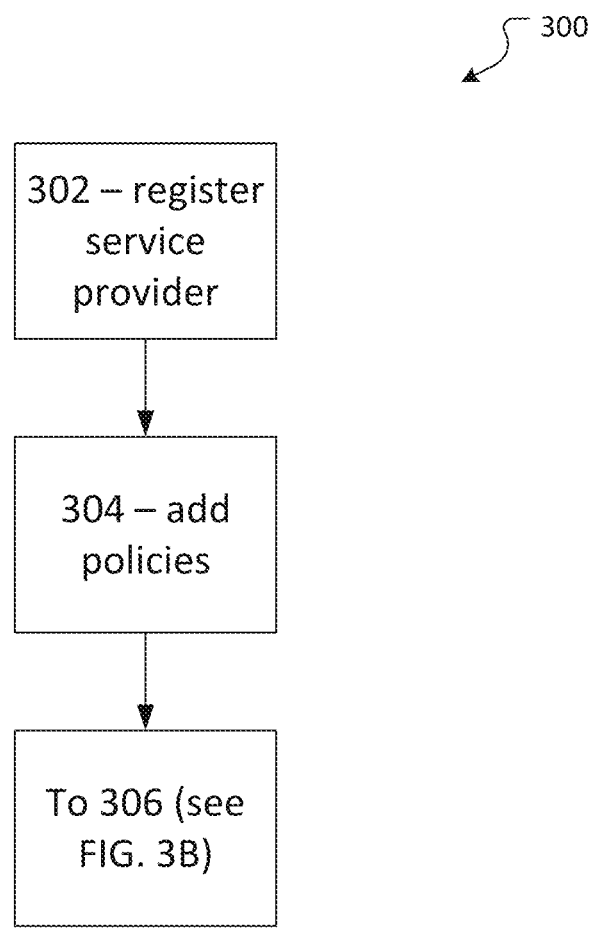
FIG. 3A shows a setup portion of an authentication and authorization process according to an embodiment of the present disclosure.
Figure 3B:
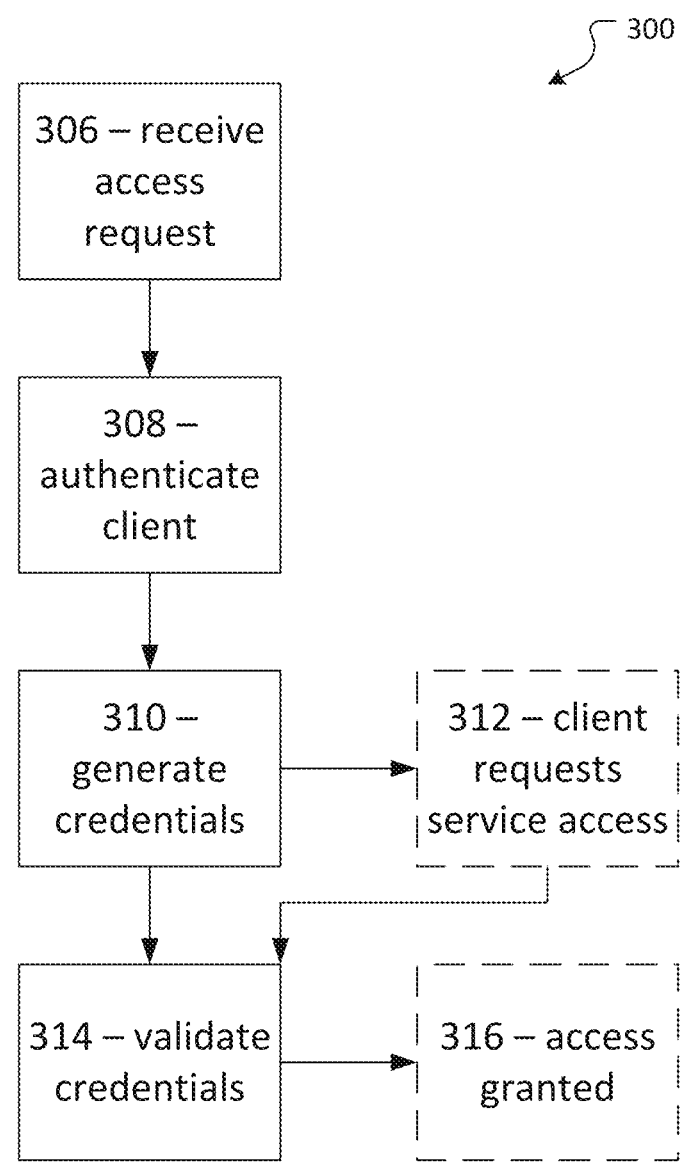
FIG. 3B shows a runtime portion of an authentication and authorization process according to an embodiment of the present disclosure.

FIGS. 3A-3B show an authentication and authorization process 300 according to an embodiment of the present disclosure. For example, central authority 130 may perform process 300, alone or in conjunction with query system 140 and/or service provider 150, to allow client 120 or a specific process/user 125 thereof to access a service supplied by service provider 150. Process 300 may establish and/or leverage a first trust relationship between central authority 130 and client 120.

FIG. 3A shows a setup portion of process 300. At 302, central authority 130 may register service provider 150 and/or one or more specific services provided by service provider 150. In some embodiments, in order for a service to use central authority 130 to maintain access permissions for clients 120, the service should register with central authority 130 first. In some embodiments, registration may be performed between central authority 130 and service provider 150 through secure shell (SSH) or other secure communication. For example, an administrator with SSH access may log into central authority 130 from service provider 150 to register service provider 150. Central authority 130 may register the service according to an asymmetric key policy, for example including sending a private key to service provider 150 and maintaining a corresponding public key stored in memory at central authority 130. Accordingly, during future access attempts by service provider 150, service provider 150 may send a message generated using the private key, and central authority 130 may authenticate the message using the corresponding public key. Central authority 130 may register the service in other ways in other embodiments. For example, central authority 130 may use any trusted entity to register the service, such as by a user interface after authenticating the user as a trusted administrator, through an API using a trusted administrator policy and/or key, or any other trusted methodology. In some embodiments, the registration may specify whether service provider 150 may be accessed according to a single policy or multiple policies (e.g., separate policies for different clients 120 and/or processes and/or users 125).

At 304, central authority 130 may add one or more access policies for service provider 150 registered at 302. An access policy may define one or more rules with which a machine, user, or process requesting authentication may be required to comply. Central authority 130 may support multiple types of access policies. For example, one access policy type may utilize asymmetric keys, and another access policy type may utilize one or more AWS policies (roles). As described below, techniques used to verify compliance with the rules of an access policy may vary in some embodiments.

For example, in order for a client 120 to access an API, the client may need an authentication credential known as an API key. Client 120 may be required to conform to an API access policy in order to get the API key directly from central authority 130. The policy may include a set of rules defining one or more characteristics client 120 may require in order to be eligible to receive the key. The policy may be any set of rules and/or properties that must be met by client 120 and may be cloud specific and/or cloud agnostic. For example, a policy may include rules related to an IP address and/or universal unique identifier (UUID) of client 120. In another example, a policy may include rules related to specific AWS properties required of client 120, such as an IAM role for client 120, a specific auto scaling group to which client 120 is required to belong, a specific subnet to which client 120 is required to belong, etc.

When service provider 150 adds its access policies, it may first authenticate with central authority 130 using its private key. The access policy may include service proprietary data which may be transparent to central authority 130 and which may be available to service provider 150 at subsequent portions of process 300 as described below. In addition to adding access policies to central authority 130, service provider 150 may distribute an access policy ID to clients 120.

Figure 4:
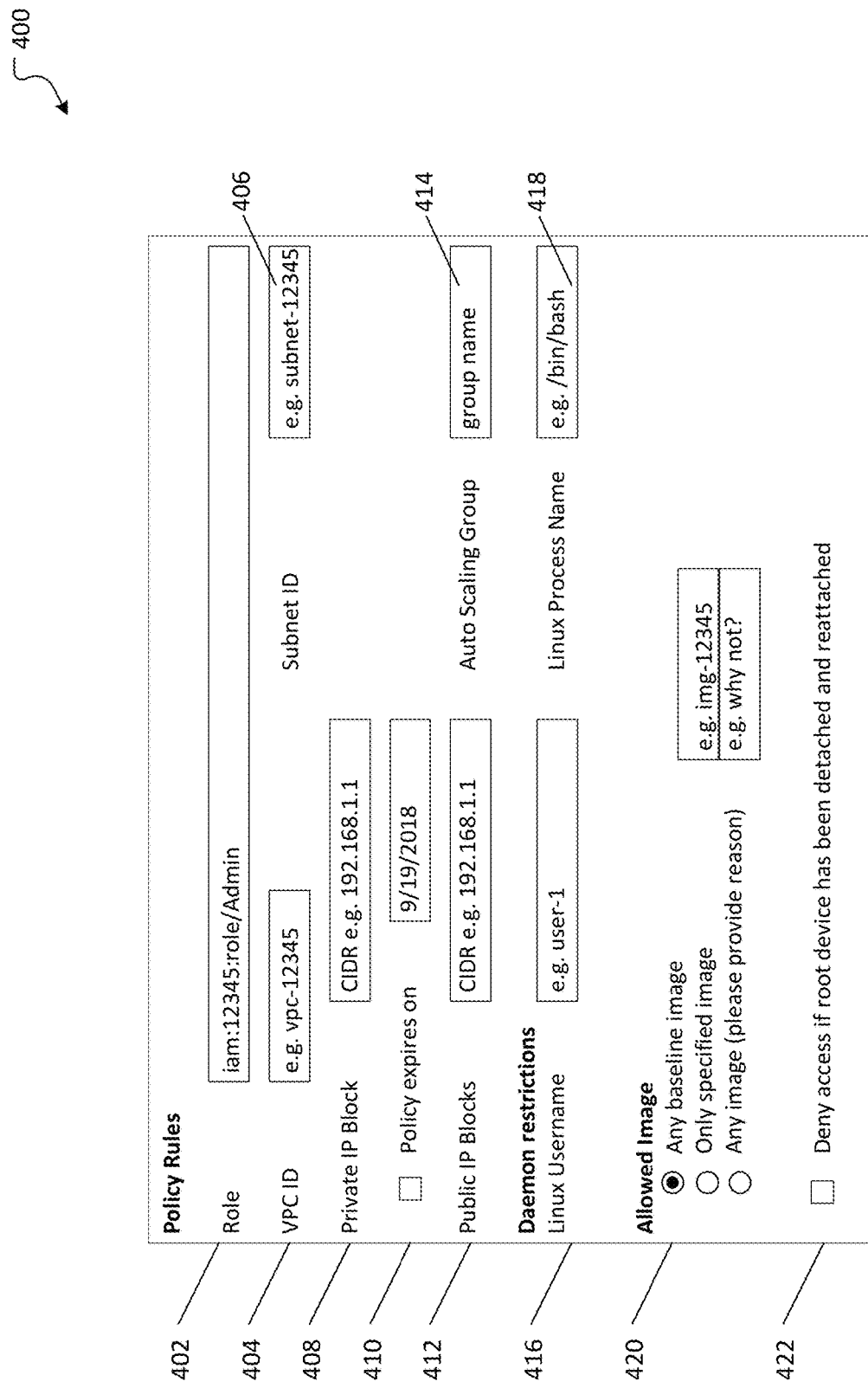
FIG. 4 shows a policy definition user interface according to an embodiment of the present disclosure.

In some examples, a user may enter policy rules using an interface such as that shown in FIG. 4. FIG. 4 shows a policy definition user interface 400 according to an embodiment of the present disclosure. User interface 400 may be provided by service provider 150 locally and/or by service provider 150 accessing data hosted by central authority 130. User interface 400 may include one or more controls for specifying policy rules. The example user interface 400 of FIG. 4 includes several examples of policy rules that may be set with user interface 400. For example, policy rules may include, but are not limited to, IAM role (e.g., specified with an Amazon resource name (ARN)) 402, virtual private cloud (VPC) endpoint 404, subnet ID 406, private IP block 408, policy expiration time/date 410, public IP block 412, auto scaling group 414, username for user-specific policy 416, process name for process-specific policy 418, machine image for device-specific policy 420, and/or requirement for device attachment 422. Other embodiments may omit some of these controls and/or may add other controls not shown in FIG. 4.

As illustrated in FIG. 4, policies may be defined at a client 120 level or at a process and/or user 125 level. In some embodiments, if no user and no process are defined, central authority 130 may treat all users and all processes for an authorized client 120 as authorized. In some embodiments, once any user is configured, all other users may be treated as unauthorized. In some embodiments, once any process (e.g., executable, fullpath) is configured, all other processes may be treated as unauthorized. If only processes are defined but no users are defined, all users may be treated as authorized. Likewise, if only users are defined but no processes are defined, all processes may be treated as authorized. However, if both users and processes are defined, only a correct combination of both user and process may be authorized.

Central authority 130 may receive policies from service provider 150 and store the policies in a local database. For example, central authority 130 may store one or more Javascript Object Notation (JSON) elements defining the policy for a given service, which may include specific authorized username and/or process name data if specific users and/or processes have been defined as described above. Central authority 130 may store keys (e.g., HMAC keys) associated with authorized clients, users, and/or processes for given policies for performing authentication as described below, for example.

FIG. 3B shows a runtime portion of process 300. While the setup portion (302 and 304) may be performed to establish a registration and a policy for service provider 150, once the service provider 150 has been registered and has provided a policy, the setup portion may need not be repeated. In some cases, 304 may be repeated to change a policy applicable to service provider 150. On the other hand, the following runtime elements of process 300 may be repeated whenever client 120 attempts to access a service provided by service provider 150.

At 306, central authority 130 may receive an access request from client 120 for a service provided by service provider 150. For example, whenever client 120 wants to access the service, it may send a request to central authority 130 with policy ID and parameters required by the policy for the service. In some embodiments, the request may include a predefined string with time and/or nonce signed by private key for authentication using the asymmetric key policy. In some embodiments, the request may include an AWS identity document with signature and/or pre-signed caller identity URL for authentication using the AWS access policy.

Figure 5:
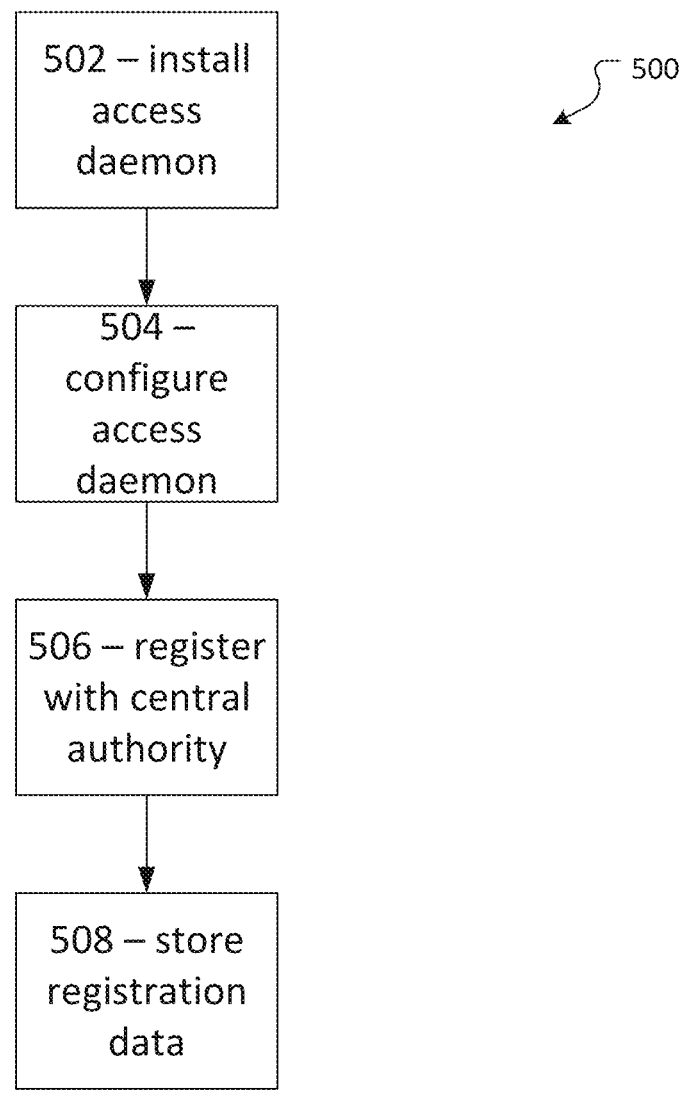
FIG. 5 shows a client setup and registration process according to an embodiment of the present disclosure.

Sending a request with a predefined string and/or AWS identity document may be adequate for enforcement of policies that control access on a client 120 machine level. In some embodiments, such as when the policy controls access on a process and/or user 125 level, so that a given client 120 may or may not be able to access the service depending on which process and/or user 125 is attempting the access, additional client 120 processing may be applied. For example, FIG. 5 shows a client setup and registration process 500 according to an embodiment of the present disclosure. Client 120 may perform process 500 to prepare for process and/or user 125 level access to services provided by service provider(s) 150 in some embodiments.

At 502, client 120 may install an access daemon that may be configured to interface with central authority 130 through network 110. For example, a root user of client 120 may run an installation program that may install the daemon. The daemon may be configured to auto-start on client 120 boot so that connectivity with central authority 130 may be restored after a reboot, for example. Configuration data for the daemon (e.g., established through process 500 as described below) may be read and loaded upon auto-start.

Some embodiments may use alternatives to the access daemon. For example, some embodiments may use a separate machine that may be called and that may perform processing in order to obtain information on the caller. Some embodiments may use a multifactor authentication machine to receive authentication of the caller, for example. Some embodiments may use a specific OS module that performs similar processes. In any case, the daemon, machine, or module may obtain reliable information on the requesting entity for which access is governed as predefined in a policy.

The daemon solution may be used because it may have access to information regarding the accessing process and user that it may retrieve from the operating system and/or because it may be difficult to spoof.

At 504, client 120 may configure the access daemon. For example, the root user may configure the daemon executable with policy and/or endpoint information. In some embodiments, multiple policies may be allowed, enabling the daemon to communicate with central authority 130 to provide access to a variety of services for one or more users and/or processes.

At 506, client 120 may register with central authority 130. For example, client 120 may communicate with central authority 130 for a first time (e.g., sending a request to register), and central authority 130 may establish a trust on first use (TOFU) relationship with client 120 based on a UUID of client 120. This first trust may be the basis for later usage of the authorization service from client 120. For example, as a response to the request to register, central authority 130 may send a secret to client 120 (e.g., a JSON web token (JWT) with a HMAC key in the payload).

TOFU may provide an underlying mechanism of trust that may establish specific trust in a particular machine for central authority 130. Some embodiments may use other options to establish trust, such as pre-assigning a secret to a daemon. Client 120 may register with central authority 130 using other types of secrets in other embodiments, such as passwords, symmetric keys, asymmetric keys, or any other kind of pre-shared secret that may be used for authentication purposes. Any option used may be required to establish trust in a dynamic (cloud) environment while maintaining a high level of security.

At 508, client 120 may store the registration data. For example, the daemon may store the secret in client 120 memory (e.g., in a config file accessible only to root, where the config file may include a JSON array with each object in the array containing the policy-id and the JWT received for that policy registration). In some embodiments, due to the TOFU arrangement, once the daemon registers, central authority 130 may disallow other registrations from the same client 120, and all credential requests (e.g., described below) may be required to go through the registered daemon. An application on client 120 may be required to communicate with the daemon in order to be authenticated and receive its access credentials. Any direct communication by the application with central authority 130 may fail if the daemon has already established trust.

Returning to FIG. 3B, at 308, central authority 130 may authenticate client 120. For example, central authority 130 may evaluate evidence in the request and may use its own and/or other resources to determine whether client 120 complies with policy rules.

For embodiments wherein the request includes a pre-defined string and/or an AWS identity document, central authority 130 may analyze the string and/or document for policy compliance. For example, central authority 130 may authenticate client 120 based on the access policy criteria by verifying that client 120 matches all criteria. The verifying may include comparing the contents of the string to the policy data stored in the central authority 130 database to determine whether the parameters match. The parameters may be signed and validated, so service provider 150 may be able to trust that they were not maliciously edited. For AWS access policies, the verifying may include comparing the contents of the document to the policy data stored in the central authority 130 database and additional data to determine whether the parameters match. The additional data may include external parameters. In order to determine these external parameters, central authority 130 may cause query system 140 to obtain the external parameters through network 110. For example, query system 140 may query AWS infrastructure API(s) related to client 120 and/or service provider 150 to gather details relevant to client's 120 compliance with the parameters. In a specific example, query system 140 may query an AWS API to determine whether an AWS document from client 120 signed by AWS is legitimate. In another specific example, query system 140 may query a private network 110 to which client 120 is connected to verify a private IP address reported by client 120. Another example parameter may include a "Created-For" field by which service provider 150 may identify the client 120 for which service provider 150 created the policy and may create a link between the policy and the authentication of this policy to its listing of clients 120. Another example parameter may include an "Opaque" field by which service provider 150 may store anything in theory, such as authorization data which may allow service provider 150 to receive not only validation of authority once client 120 identifies itself to central authority 130, but also to check what operations client 120 may be allowed to perform on the specific service provider 150. If the parameters match, central authority 130 may authenticate client 120. If one or more parameters do not match, central authority 130 may send a message to client 120 indicating client 120 cannot be authenticated based on the provided parameters.

For embodiments wherein client 120 uses the access daemon, central authority 130 may provide access credentials not only based on policy compliance but also based on the secret that was provided as described above. For example, when called by an application on client 120, the daemon may sign a request with a signing key from the secret. The daemon may also gather information on the process which called it. The information may be gathered by establishing a named pipe, which may then lead to the process ID and other relevant information describing the process and/or the user running the process. For example, the named pipe may be a Unix socket for local machine interactions. The named pipe may be accessible to all users for read and write. For example, the named pipe may be world-writeable and readable so that all users can write a request and read a response. The directories may be world-traversable so all users can reach the named pipe. Client 120 processes may communicate with the daemon using the named pipe in order to get central authority 130 credentials. Client 120 may send the signed request generated by the daemon to central authority 130 for obtaining access credentials. Central authority 130 may authenticate client 120 by determining that the secret in the signed request matches the expected secret in central authority 130 memory generated as described above. If the secret is correct and the parameters match, central authority 130 may authenticate client 120. If the secret is incorrect and/or one or more parameters does not match, central authority 130 may send a message to client 120 indicating client 120 cannot be authenticated based on the provided secret and/or parameters.

At 310, if client 120 has been authenticated at 308, central authority 130 may generate credentials for client 120. For example, an authenticated client 120 may send a request to central authority 130 for credentials for one or more service providers 150. In response, central authority 130 may generate signed temporary credentials in JWT format. The credentials may be generated with an expiration time and/or date. The credentials may include service proprietary data (if any) that may be associated with the access policy used to obtain the temporary credentials. For example, the proprietary data may be used for further authorization of client 120 by service provider 150 itself. Central authority 130 may send the credentials to client 120.

In some embodiments, the request may identify the service to which client 120 is requesting access within a JWT that may be signed by the client 120 private key. In embodiments wherein client 120 may have separate processes and/or users 125 who may be requesting access, client 120 may perform additional processing to generate the request. For example, the daemon may obtain information on the user and process (e.g., using linux syscalls). The daemon may generate a request with the following values, for example: user name, group name, process fullpath, user ID, group ID. In response, central authority 130 may generate signed temporary credentials in JWT format. The credentials may be generated with an expiration time and/or date. The credentials may include service proprietary data (if any) that may be associated with the access policy used to obtain the temporary credentials. For example, the proprietary data may be used for further authorization of client 120 by service provider 150 itself. Central authority 130 may send the credentials to client 120.

At 312, client 120 may request access to the service. For example, client 120 may send the credentials (e.g., the JWT) to service provider 150. Service provider 150 may send the credentials to central authority 130 for verification.

At 314, central authority 130 may validate the credentials sent by service provider 150. For example, central authority 130 may validate data in the JWT. If the policy does not include process and/or user level access requirements, central authority 130 may use the public key to verify the signature. If the policy contains user or process level entries, central authority 130 may use the public key to verify the signature and may also verify the user and/or process against the policy. If validated, central authority 130 may send a key for accessing service provider 150 to client 120 and/or may send a message to service provider 150 causing service provider 150 to provide access to client 120. If the signature is not validated, central authority 130 may notify client 120 and/or service provider 150 that access should be denied.

At 316, based on the validation at 314, service provider 150 may provide the service to client 120. In some embodiments, client 120 may include the temporary credentials in a header in every request to service provider 150. Service provider 150 may validate the temporary credentials by fetching the verification key from central authority 130 or by sending a validation request together with the temporary credentials to central authority 130 (e.g., by repeating processing at 314).

As the foregoing description illustrates, the disclosed systems and methods may provide centralized authentication and authorization of clients 120 for accessing remote services based on a variety of policies. For example, the same central authority 130 may validate different clients 120 for different services based on different policies. The elements of the system (e.g., central authority 130, client 120, and/or service provider 150) may be policy-agnostic (e.g., the policy may specify any terms and may even change over time, but the authentication and authorization may be performed similarly for all policies). This may result in an efficient, secure, and flexible authentication and authorization solution. Moreover, this may result in a flattening of communications between client 120 and service provider 150 (e.g., because service provider 150 and client 120 may not be required to exchange several authentication and authorization messages between one another) while still allowing for trustworthy authentication and authorization.

Clients 120 and central authority 130 may leverage the authentication and authorization techniques described above, or other authentication and authorization techniques, to provide certificate management systems and methods. By these certificate management systems and methods, an arbitrary virtual machine may become a trusted communication endpoint. For example, a virtual machine (e.g., which may be a client 120 or portion thereof) may be spawned to host a service, or some other endpoint (e.g., other client 120 or portion thereof) may host the service. However, a client interested in consuming this service may first attempt to make sure that it is communicating with a legitimate endpoint. The virtual machine then may be required to differentiate itself from any other virtual machine that may be controlled by a rogue entity. For example, the virtual machine may be distinguishable by a differentiating factor. The differentiating factor may be introduced by the distinct attributes that may be expected to be possessed by the given virtual machine during its runtime. An example of one such attribute when running on an AWS EC2 instance is the AWS Role ARN.

By leveraging the authentication and authorization techniques described above, these attributes may be used to create a policy that may be used by the virtual machine to prove its identity to any service, such as a secure sockets layer (SSL) certificate management service. When the virtual machine is spawned, it may use a local dedicated agent to retrieve its credentials to authenticate with the central authority 130, which may provide the agent with a valid SSL certificate or other certificate that may be usable with external processes (e.g., any standard publicly-used certificate format may be used in some embodiments). Using the SSL certificate, the hosted service may be able to provide a trusted and compliant SSL communication endpoint. In effect, the AWS Role ARN or other identification attribute generated as described above may be used to attain a certificate authority (CA) signed SSL certificate. This may allow the virtual machine to be identified and authenticated by a significantly broader circle of trust, which may include a variety of SSL compliant agents.

Figure 6:
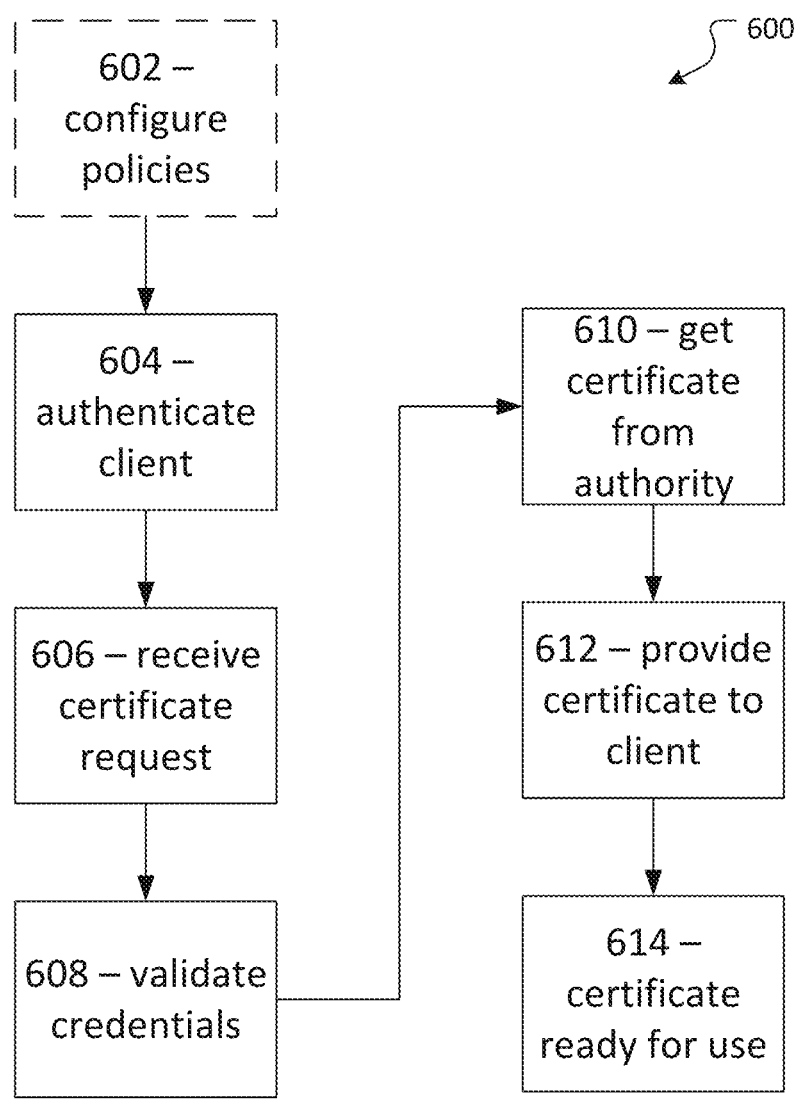
FIG. 6 shows a certificate management process according to an embodiment of the present disclosure.

FIG. 6 shows a certificate management process 600 according to an embodiment of the present disclosure. Central authority 130, certificate manager 136, and certificate agent 126 may collaborate to perform process 600. Through process 600, a certificate may be provided and used by leveraging processes 300 and/or 500 as described above. While process 600 is described as basing certificate provisioning on temporary credentials generated as described above, process 600 may provide a technology agnostic context that may provide certificates on the basis of any policy based primitives, and may not be limited to any specific underlying credentials. By performing process 600, central authority 130 may establish and/or use a second, separate trust relationship from that between central authority 130 and client 120 to provide the certificate.

At 602, central authority 130 and/or certificate manager 136 may configure one or more policies that may govern how certificates are provided. In some embodiments, policy configuration at 602 may be performed only as a setup step (e.g., during a first time process 600 is run and/or only when changes to the policy are desired). During runtime processing, policy configuration at 602 may be skipped or otherwise not performed.

Policy configuration may include defining one or more links or associations between temporary credentials described above and certificates provided through process 600. In some embodiments, policy configuration may be performed by an admin user defining and/or approving policy conditions. Policy configuration may specify what certificates are available to a given virtual machine or other process having a given temporary credential. For example, a policy may specify that a client holding a temporary credential granting access to a particular service may request a certificate for a domain related to that service (e.g., for AWS policy 123, certificate for 123.com is available). In another example, a policy may specify that a client holding a temporary credential granting access to a plurality of services offered by a common provider may request a certificate for a domain related to the common provider (e.g., for authenticated clients of suite XYZ, certificate for XYZ-.com is available). In a specific example, when running in AWS, the Role ARN expected to be possessed by the applications' EC2 instance may be included in the policy.

Upon successful creation of the policy, central authority 130 and/or certificate manager 136 may output a policy ID, which may be made available to certificate agent 126. For example, client 120 may obtain the policy ID from central authority 130 and/or certificate manager 136 through network 110.

At 604, central authority 130 may authenticate client 120. For example, central authority 130 may grant one or more temporary credentials to client 120 as described above (e.g., through processes 300 and/or 500). In some embodiments, client 120 may include information in the access request indicating that the returned temporary credentials may be for use in obtaining a certificate. For example, input parameters from client 120 may include the policy ID provisioned at 602 and/or a signed identity document. An example identity document may include an AWS identity document that may be available to client 120 by virtue of running on an AWS EC2 instance. If client 120 passes the authentication check, central authority 130 may return a signed token as the temporary credentials.

At 606, certificate manager 136 may receive a certificate request from certificate agent 126 of client 120. For example, client 120 may be a device hosting an application that can be certified. Client 120 may also include certificate agent 126 which may be configured to communicate with certificate manager 136. Using the token provided at 604, certificate agent 126 may request a certificate and key from certificate manager 136. For example, the request from certificate agent 126 to certificate manager 136 may include the token and request data (e.g., the policy ID and/or other information identifying the certificate or useable to identify the certificate). The request may identify the policy under which the request is made, which may allow certificate agent 126 to identify the requested certificate as being a certificate associated with the identified policy. In other embodiments, the request may specifically identify the requested certificate.

At 608, certificate manager 136 may validate the token from the request received at 606. For example, as noted above, central authority 130 may have signed the token. Accordingly, certificate manager 136 may use a public key associated with central authority 130 to validate the signed token provided by certificate agent 126. While the token is provided to client 120 contingent on successful authentication by processes 300 and/or 500 in this example, it may be possible for some embodiments to validate tokens that are signed based on trust established by other identity verification processes, including any known or unknown identity verification process (e.g., based on RSA keys, AWS primitives, etc.). In other words, the disclosed embodiments are not limited to any specific type of primitive, such as an AWS primitive.

At 610, certificate manager 136 may obtain the requested certificate. For example, certificate manager 136 may store certificates locally or may obtain certificates from a third party certificate manager (e.g., through network 110 and/or a secure communications channel). In the latter case, certificate manager 136 may use privileged credentials to access the third party certificate manager and submit a certificate signing request. The third party certificate manager may return a valid CA signed certificate and private key.

At 612, certificate manager 136 may provide the certificate to client 120. For example, certificate manager 136 may send the valid CA signed certificate and private key to certificate agent 126 through network 110.

At 614, client 120 may use the certificate. Client 120 may use the certificate to prove its authenticity in any situation warranting such proof. For example, some use cases may involve deploying a client 120 as an SSL server with a valid SSL certificate and maintaining that certificate by replacing it anytime it is expected to become invalid at application runtime. By providing certificate agent 126 with a valid policy that is identified with the host runtime attributes, certificate agent 126 may be able to retrieve a valid SSL certificate and key on demand. Using the provided certificate and key, client 120 may be able to provide a trusted endpoint on the public Internet.

The certificates may have any validity period. For example, they may last for a long time period (e.g., months or years), or they may be generated to expire after a very short period of time (e.g., seconds, minutes, hours, etc.), making them appropriate for ad hoc or limited use cases. The certificates may be used to provide identity verification on the public Internet or any smaller domain (e.g., on a local network, at a peer to peer device level, etc.).

Accordingly, the disclosed embodiments may provide secure, easily updatable certificate provisioning that may leverage other identity verification processing (e.g., processes 300 and/or 500) to provide additional layers of trust to the CA and, subsequently, to other parties on the public Internet or other network(s). Clients 120 (including subprocesses thereof) may use a combination of processes 300, 500, and 600 to provide authentication and/or access authorization within networks 110 that use the disclosed authentication and/or access methodologies and with outside elements that do not use the disclosed authentication and/or access methodologies (e.g., using a certificate).

Note that while in many examples provided herein, a client 120 uses a certificate to prove its identity to a service provider 150, the opposite may occur, and a service provider 150 may use a certificate to prove its identity to a client 120. In these cases, the aforementioned processes 300, 500, and/or 600 may proceed similarly to the examples given above, but with the roles of client 120 and service provider 150 reversed. For example, a service provider 150 may attempt to communicate with a client 120, and central authority 130 may authenticate service provider 150. Service provider 150 may request and receive a certificate, for example. Indeed, any computing process may be authenticated, and any computing process may request authentication of any other computing process.

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. For example, other steps may be provided, or steps may be eliminated, from the described flows, and other components may be added to, or removed from, the described systems. Accordingly, other implementations are within the scope of the following claims.

In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

What is claimed is:

1. A method of providing a certificate for a computing process, comprising:
   establishing, by at least one processor of a central authority that is separate from the computing process, a policy by generating policy identifier (ID) data and associating the policy ID data with at least one third party certificate;
   providing, by the at least one processor, the policy ID data to the computing process;
   establishing a first trust relationship between the computing process and the central authority, the establishing comprising:
      authenticating, by the at least one processor, the computing process, the authenticating including the central authority providing a signed token to the computing process;
      receiving, by the at least one processor, a request for the third party certificate from the computing process, the request including the signed token and the policy ID data;
      determining, by the at least one processor, that the computing process is eligible for the third party certificate according to the policy; and
      validating, by the at least one processor, the signed token;
   in response to the establishing, obtaining, by the at least one processor, the third party certificate, the third party certificate being signed by a third party certificate authority with which the central authority has a second trust relationship separate from the first trust relationship; and
   providing, by the at least one processor, the third party certificate to the computing process.

2. The method of claim 1, wherein the authenticating includes:
   determining that the computing process complies with an access policy;
   in response to determining that the computing process complies with the access policy, generating the signed token; and
   sending the signed token to the computing process.

3. The method of claim 1, wherein the determining includes:
   identifying the policy or the third party certificate from the policy ID data; and
   determining that the signed token grants permission to obtain the third party certificate according to the policy.

4. The method of claim 1, wherein the validating includes validating the signed token using a public key associated with a signing computer that signed the signed token.

5. The method of claim 1, further comprising establishing, by the at least one processor, the second trust relationship with the third party certificate authority prior to the obtaining.

6. The method of claim 1, wherein the obtaining includes sending a request for the third party certificate to the third party certificate authority or obtaining a previously generated copy of the third party certificate from a memory.

7. The method of claim 1, wherein:
   the central authority includes a certificate manager configured to perform the determining, validating, obtaining, and providing; and
   the at least one processor includes at least two processors, one of the at least two processors performing the authenticating, and another of the at least two processors providing the certificate manager.

8. The method of claim 1, further comprising registering, by the at least one processor, the computing process, the registering comprising establishing the central authority as an authentication and access authority for the computing process.

9. A system for providing a certificate for a computing process, comprising:
   a hardware transceiver configured to communicate with a computing process; and
   at least one hardware processor in communication with the transceiver, the at least one processor being configured to perform processing comprising:
      establishing a policy by generating policy identifier (ID) data and associating the policy ID data with at least one third party certificate;
      providing, using the transceiver, the policy ID data to the computing process;
      establishing a first trust relationship between the computing process and the at least one processor, the establishing comprising:
         authenticating the computing process, the authenticating including providing, using the transceiver, a signed token to the computing process;
         receiving, using the transceiver, a request for the third party certificate from the computing process, the request including the signed token and policy ID data;
         determining that the computing process is eligible for the third party certificate according to the policy; and
         validating the signed token;
      in response to the establishing, obtaining the third party certificate, the third party certificate being signed by a third party certificate authority with which the at least one processor has a second trust relationship separate from the first trust relationship; and
      providing, using the transceiver, the third party certificate to the computing process.

10. The system of claim 9, wherein the authenticating includes:
    determining that the computing process complies with an access policy;

in response to determining that the computing process complies with the access policy, generating the signed token; and sending, using the transceiver, the signed token to the computing process.

11. The system of claim 9, wherein the determining includes:

identifying the policy or the third party certificate from the policy ID data; and determining that the signed token grants permission to obtain the third party certificate according to the policy.

12. The system of claim 9, wherein the validating includes validating the signed token using a public key associated with a signing computer that signed the signed token.

13. The system of claim 12, wherein the signing computer includes the at least one processor.

14. The system of claim 9, wherein the obtaining includes sending a request for the third party certificate to the third party certificate authority or obtaining a previously generated copy of the third party certificate from a memory.

15. The system of claim 9, wherein the at least one processor includes at least two processors, one of the at least two processors performing the authenticating, and another of the at least two processors performing the determining, validating, obtaining, and providing.

16. The system of claim 9, wherein the processing further comprises registering the computing process, the registering comprising establishing the central authority as an authentication and access authority for the computing process.

17. The system of claim 9, wherein the processing further comprises establishing the second trust relationship with the third party certificate authority prior to the obtaining.

18. A method of providing a certificate for a client device, comprising:

establishing, by at least one processor of a central authority that is separate from the client device, a policy by generating policy identifier (ID) data and associating the policy ID data with at least one third party certificate;

providing, by the at least one processor, the policy ID data to the client device;

authenticating, by the at least one processor, the client device to thereby establish a first trust relationship, the authenticating including:

determining that the client device complies with an access policy, in response to determining that the client device complies with the access policy, generating a signed token, and sending the signed token to the client device;

receiving, by the at least one processor, a request for the third party certificate from the client device, the request including the signed token and the policy ID data;

determining, by the at least one processor, that the client device is eligible for the third party certificate according to the policy;

validating, by the at least one processor, the signed token;

in response to the determining and the validating, obtaining, by the at least one processor, the third party certificate, the third party certificate being signed by a third party certificate authority with which the at least one processor has a second trust relationship separate from the first trust relationship; and providing, by the at least one processor, the third party certificate to the client device.

* * * * *